(No Model.)  2 Sheets—Sheet 1.
I. F. GILMORE & A. P. BRANAMAN.
SEEDER AND CULTIVATOR.
No. 375,741.  Patented Jan. 3, 1888.
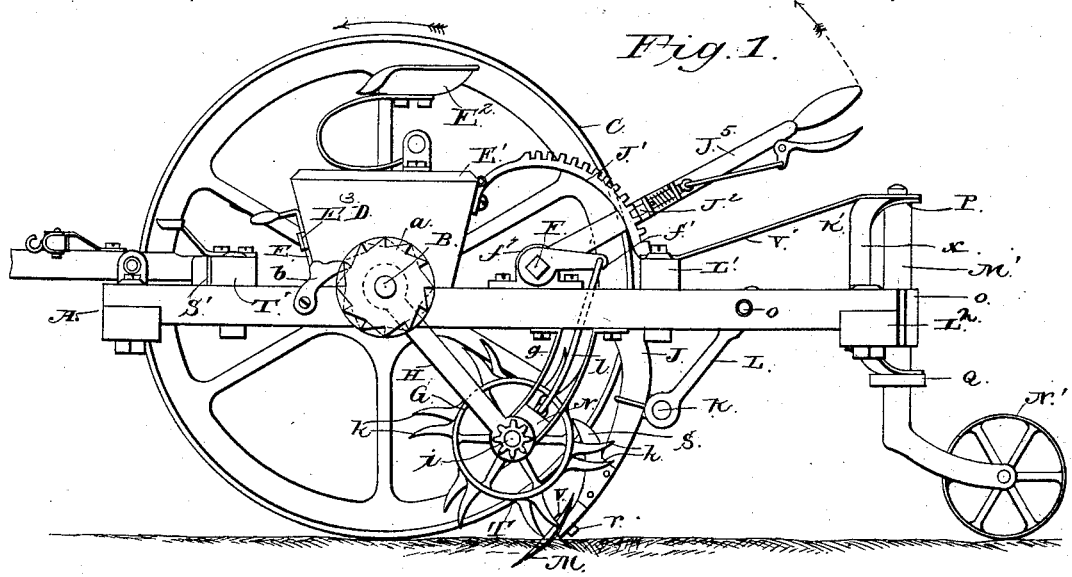
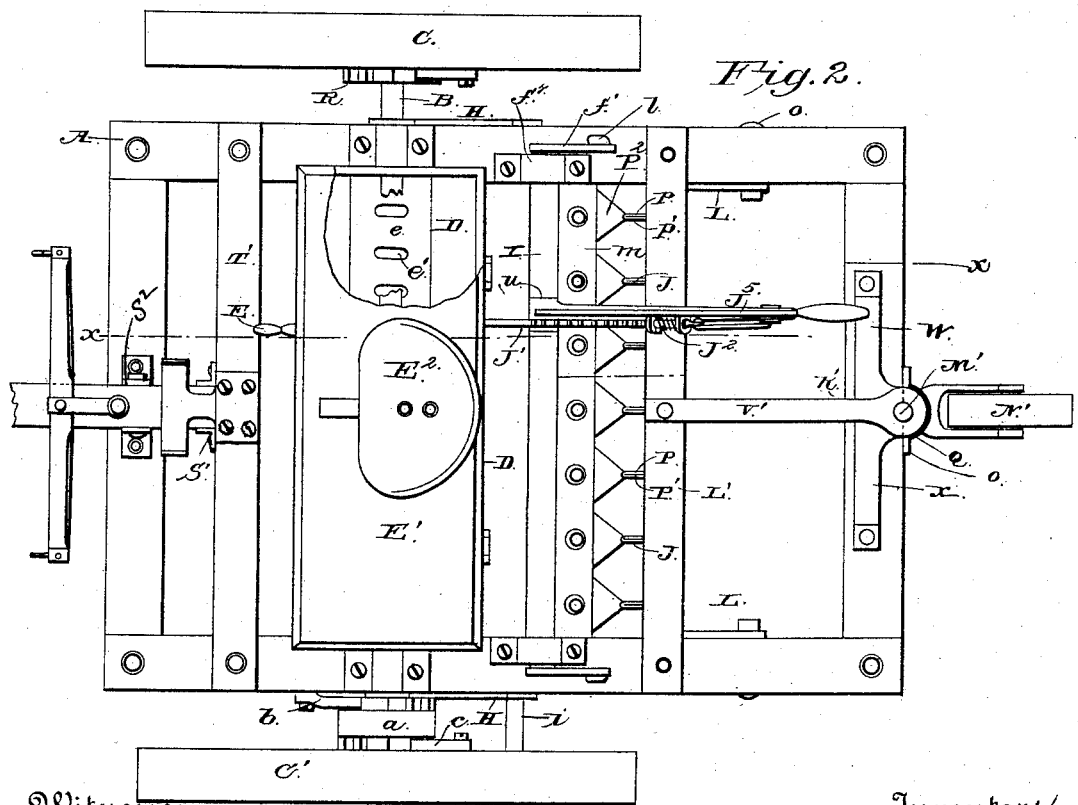
Witnesses
M. Fowler
R. W. Bishop.
Inventors
Ira F. Gilmore
Addison P. Branaman
By their Attorneys
C. A. Knowles (No Model.) 2 Sheets—Sheet 2.
I. F. GILMORE & A. P. BRANAMAN.
SEEDER AND CULTIVATOR.
No. 375,741. Patented Jan. 3, 1888.
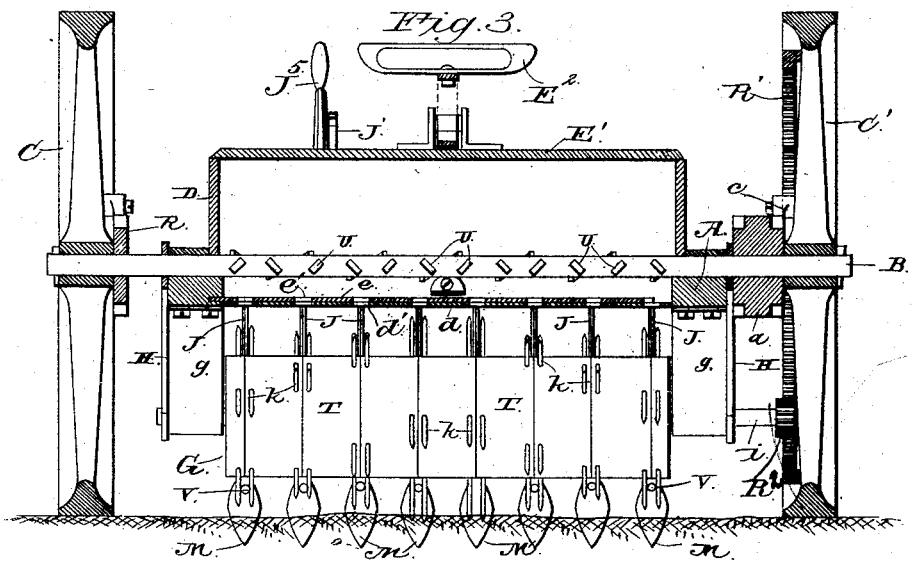
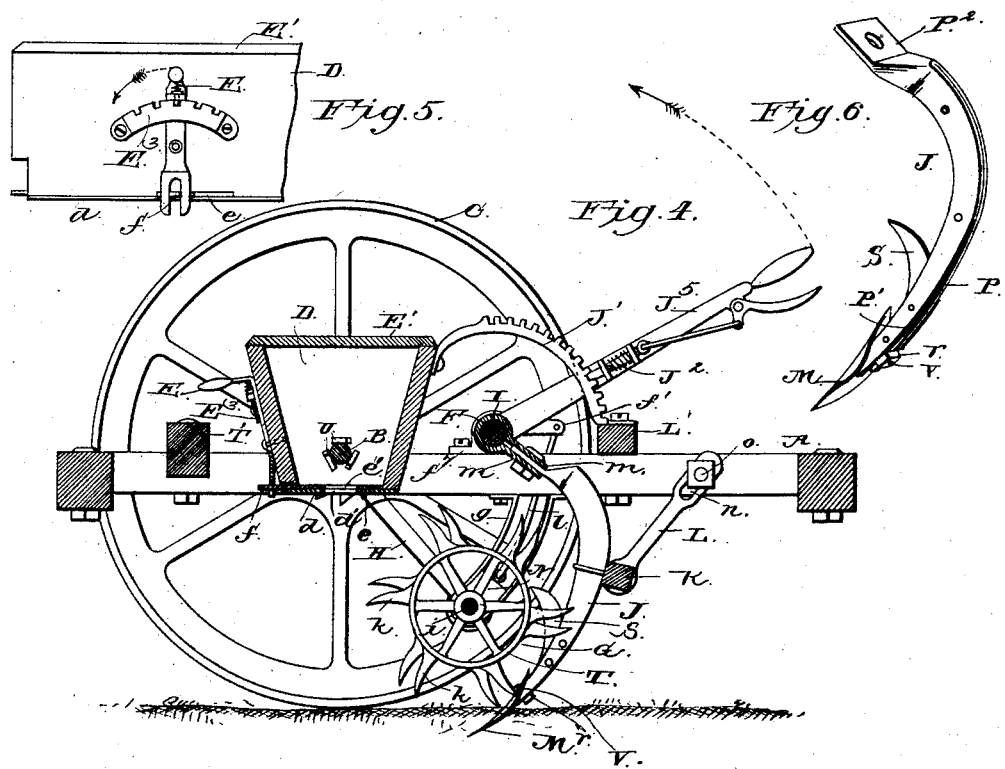
Witnesses
M. Fowler
R. W. Bishop.
Inventors
Ira F. Gilmore
Addison P. Branaman
By their Attorneys
C. A. Snowden
N. PETERS, Photo-Lithographer, Washington, D. C.

UNITED STATES PATENT OFFICE.

IRA F. GILMORE AND ADDISON P. BRANAMAN, OF LEROY, ILLINOIS; SAID BRANAMAN ASSIGNOR OF ONE-HALF HIS RIGHT TO JOHN T. KELLY, OF SAME PLACE.

SEEDER AND CULTIVATOR.

SPECIFICATION forming part of Letters Patent No. 375,741, dated January 3, 1888.

Application filed September 27, 1887. Serial No. 250,843. (No model.)

*To all whom it may concern:*

Be it known that we, IRA F. GILMORE and ADDISON P. BRANAMAN, citizens of the United States, residing at Leroy, in the county of McLean and State of Illinois, have invented a new and useful Improvement in a Combined Seeder and Cultivator, of which the following is a specification.

This invention has reference to combined seeders and cultivators; and it consists in the improved construction, hereinafter described, whereby the seed may be readily dropped, the stalks and trash raked from the ground and cut to enable their more effective disposition, and permit the covering of the deposited seed.

In the accompanying drawings, forming part of this specification, Figure 1 is a side view of a machine embodying our improvements, one of the carrying wheels being removed for the purpose of more clearly showing the parts. Fig. 2 is a plan view, a portion being broken away. Fig. 3 is a transverse sectional view through the seed-hopper and its valve mechanism. Fig. 4 is a longitudinal sectional view on the dotted line $x\ x$ of Fig. 2. Fig. 5 is a detail view of the lever for regulating the seed-valves, and Fig. 6 is a detail view of the standards carrying the trash-cutting knives.

A represents the rectangular supporting-frame of the machine, comprising the usual side, front, and rear bars.

The main shaft B is journaled in the main frame, and has the carrying-wheels C C' mounted loosely on its ends.

Keyed on the shaft B adjacent to the wheel C' is a double-ratchet wheel $a$, which has its series of teeth arranged in opposite directions. A pawl, $b$, is pivoted on the side of the frame and engages the inner ratchet-teeth, while a pawl, $c$, is located on the wheel C' to engage the outer series of ratchet-teeth when the wheel revolves in the direction of the arrow, Fig. 1. The pawls swing sufficiently free on their pivots to enable them to be readily thrown into and out of engagement.

A feed-hopper, D, incases the main axle B between the side bars of the frame, and the bottom $d$ of the said hopper is provided with a series of transversely-elongated openings, $d'$. A valve-plate, $e$, lies within the same, and is also provided with transversely-elongated openings $e'$, which may be brought into or out of line with the openings $d'$ in the bottom. A tongue, $f$, (see Figs. 4 and 5,) extends out from the plate $e$ at the front side of the hopper and passes through and is connected to the lower forked end of an operating-lever, E, which is pivoted on the front side of the hopper. The upper end of this lever E is bent outward, as shown, and engages the upper notched edge of a segmental plate, $E^3$, secured to the hopper and extending across the lever. The latter is provided with a hinged cover or lid, E', upon which is located the operator's seat $E^2$.

A transverse shaft, F, is journaled at its ends in brackets $f^1\ f^1$ upon the main frame in rear of the hopper, and upon said ends adjacent to said brackets are located short arms $f'$. Hangers $g$ are secured to and depend from the sides of the frame nearly below the shaft F, and are curved, as clearly shown in Figs. 1 and 4. Within said hangers are located the bearing-boxes N of the shaft $i$ of the revolving rake G. The latter consists of a series of wheels, T, each of which carries a series of curved rake-teeth, $k$, the wheels T being so disposed relative to each other on the shaft $i$ that their teeth will be arranged in spiral series of a number of pairs.

Braces H are hung loosely upon the axle B and extend rearwardly in a downwardly-inclined direction, their lower ends being connected to and supporting the boxes N of the revolving rake. These braces are adapted to swing in a vertical plane upon the axle B as a center, the purpose of which will presently appear. Wires or cables $l$ are connected to and depend from the arms $f^1$ of the rock-shaft F, and are connected to the boxes N.

A plate, I, embraces the shaft F and has portions $m$ thereof extending parallel at the rear to receive and have bolted between them the upper flat ends of the standards J, which are curved, as shown, and are intermediately braced by a transverse bar, K, which is secured to the rear sides of the standards. Braces L are connected to the ends of said bar, and at their upper ends have elongated slots $n$, through which pass bolts $o$, which adjustably secure the braces to the frame.

It will be noticed that each standard consists of the flat perforated plate $P^2$, forming its upper end, and the parallel plates P P', depending from the said plate $P^2$. At the lower end of each standard is secured an approximately diamond-shaped cultivator shovel, M, the securing-bolt V of which passes through the space between the lower ends of the plates P P' and is fastened at the rear by means of a nut, $r$.

Bevel-edge knife-plates S are secured to and project from the lower portions of the standards, which receive the stalks and trash from the rake-teeth $k$ of the cylinder G and cut the same to facilitate the disposition thereof. A lever, $J^5$, is connected to the shaft F to operate the latter, and the said lever extends through a slot, $u$, in the sleeve or plate I on said shaft, so that a limited movement of the lever upward will cause a partial revolution of both the shaft F and plate I. A curved bar, J', extends from the seed-hopper to the transverse beam L' in the rear thereof, and carries a series of ratchet-teeth to engage a pawl or spring-actuated bolt, $J^2$, on the lever $J^5$.

K' designates a bracket consisting of three spring-arms, $v'\ w\ x$. The arms $w$ and $x$ are secured to the rear bar of the frame and the arm $v'$ to the transverse beam L', arranged parallel therewith, the bracket being perforated to form a bearing for the upper end of the spindle M' of the wheel N', said spindle also revolving in a bearing, O, on the rear of the frame.

It will be noticed that the upper portion of the spindle is provided with a shoulder, P, which the spring-arms bear upon, and the spindle is further provided with an annular flange, Q, which bears against a like plate on the under side of the beam. The arrangement of the bearings and arms is such that the spindle can have a limited play relative to its frame, so as to provide against inequalities in the ground.

A ratchet-wheel, R, is located on the main shaft B at the side opposite from that on which the previously-described ratchet-wheel is located, and the wheel adjacent to said ratchet-wheel is provided with a pawl, the relative arrangement of the wheel R and its pawl being such that said wheel and its shaft B will not be revolved upon the rearward rotation of the adjacent carrying-wheel.

A bracket, S', is located on the front of a bar, T', arranged in advance of the seed-hopper, and within said bracket plays and is guided the rear end of the draft-tongue $T^2$, which latter is pivoted in the bracket $S^2$ on the front bar of the frame A.

Feeding-fingers U are secured in spiral series upon the shaft B within the hopper, and said feeding-fingers serve to agitate the seed and prevent its packing in the hopper. The shaft $i$ of the revolving rake is extended past one end of the cylinder G, and is provided with a gear-pinion, $R^2$, which meshes with an internal gear-wheel, R', secured to the inner side of the carrying-wheel C', whereby the rake is caused to revolve in the same direction with the said wheel C'. It will be readily understood that a sprocket-chain and wheels could be substituted for this gear-wheel and pinion; but we prefer the gearing shown.

In operation the seed is sown broadcast from the hopper, as will be readily understood. The revolving rake takes up the trash and stalks and carries the same across the knives S, partially severing the same, after which they will be deposited to one side of the machine by reason of the spiral arrangement of the rake-teeth. The seeds are then covered by the cultivator-shovels.

The rake and the cultivators may be raised, as will be readily understood from the foregoing description, so as to adjust them according as the nature of the ground or other circumstances may require. They are raised by means of the lever $J^5$ and its connections, and the braces H serve to prevent the boxes N binding in the hangers $g$ by causing them to follow a curved line in their upward motion, as will be readily understood.

We claim—

1. The combination, with the carrying-frame, of the shaft F, the guides, bearings therein, and revolving rake, the sleeve embracing said shaft and having rearwardly-extending portions, standards secured to said portions, and a lever connected to said shaft and extending through an opening in said sleeve, substantially as described.

2. The combination, with the bracket consisting of three arms and perforated to form a bearing, of the caster-wheel having its spindle journaled in said bearing, substantially as described.

3. The combination, with the carrying-frame, of the shaft F, mounted thereon, depending hangers $g$, bearings movable in said hangers and connected to the shaft F, the revolving rake journaled in said bearings, sleeve embracing said shaft and having parallel rear portions, cultivator-standards bolted between said parallel rear portions, and a lever connected to said shaft, whereby the rake and the cultivators may be simultaneously adjusted, substantially as described.

4. The combination, with the carrying-frame, of the seed-hopper mounted thereon, the revolving rake-cylinder arranged below and in rear of the hopper, cultivator-standards pivotally mounted in the frame and arranged in rear of the rake, and shovels and bevel-edge knives secured to said standards, as set forth.

5. The combination, with the carrying-frame, of the gang of cultivator-standards pivotally mounted in the frame at their upper ends, a transverse beam secured to the rear sides of the standards, side bars having their lower ends secured to the ends of the said transverse beam and having longitudinal slots in their upper ends, and bolts passed through said slots to adjustably secure the said side bars to the side bars of the carrying-frame, substantially as set forth.

In testimony that we claim the foregoing as our own we have hereto affixed our signatures in presence of two witnesses.

IRA F. GILMORE.
ADDISON P. BRANAMAN.

Witnesses:
CHAS. A. BARLEY,
L. A. CRUMBAUGH.